US008525500B1

(12) United States Patent
Martin

(10) Patent No.: US 8,525,500 B1
(45) Date of Patent: Sep. 3, 2013

(54) CONTROL SIGNAL GENERATION AND POWER SUPPLY CIRCUITRY

(75) Inventor: Gary D. Martin, Boxford, MA (US)

(73) Assignee: International Rectifier Corporation, El Segundo, CA (US)

( * ) Notice: Subject to any disclaimer, the term of this patent is extended or adjusted under 35 U.S.C. 154(b) by 1323 days.

(21) Appl. No.: 12/237,016

(22) Filed: Sep. 24, 2008

(51) Int. Cl.
*G05F 1/00* (2006.01)

(52) U.S. Cl.
USPC .......................................................... 323/283

(58) Field of Classification Search
USPC .................................. 323/267–270, 282–284
See application file for complete search history.

(56) References Cited

U.S. PATENT DOCUMENTS

| | | | | |
|---|---|---|---|---|
| 5,406,181 A | * | 4/1995 | Wakui | 318/560 |
| 7,017,069 B2 | * | 3/2006 | Kudo et al. | 713/500 |
| 7,492,217 B2 | * | 2/2009 | Hansen et al. | 330/10 |
| 7,570,036 B2 | * | 8/2009 | Tang et al. | 323/283 |
| 7,956,590 B2 | * | 6/2011 | Zafarana et al. | 323/282 |
| 2005/0276080 A1 | * | 12/2005 | Okada | 363/41 |
| 2006/0043952 A1 | * | 3/2006 | Huang | 323/282 |
| 2008/0012540 A1 | * | 1/2008 | Chen | 323/224 |
| 2008/0054855 A1 | * | 3/2008 | Hussain et al. | 320/162 |
| 2008/0157742 A1 | * | 7/2008 | Martin et al. | 323/284 |
| 2009/0303641 A1 | * | 12/2009 | Abe | 361/18 |

* cited by examiner

*Primary Examiner* — Adolf Berhane
*Assistant Examiner* — Jeffrey Gblende
(74) *Attorney, Agent, or Firm* — Chapin IP Law, LLC

(57) ABSTRACT

According to one configuration, a controller repeatedly loads a time delay circuit with a predetermined (count) value. The predetermined count value specifies an approximate time delay between activating and/or deactivating high side switch circuitry of one or more phases in the power supply. Based on passing of time as indicated by the time delay circuit, the controller generates control signals to control high side switch circuitry (of a same or different phase) in the power supply. The high side switch circuitry in one or more phases can be successively activated or spaced in time by an approximate amount of time as specified by the predetermined (count) value.

17 Claims, 11 Drawing Sheets

CONTROL SIGNAL GENERATION AND POWER SUPPLY CIRCUITRY

BACKGROUND

It is known that a conventional voltage regulator can be used to regulate a DC voltage supplied to a load such as a microprocessor. For example, a voltage regulator can include a power converter, such as a DC-DC converter, and may include other components such as a controller for controlling operation of the power converter.

An example of a DC-DC converter is a synchronous buck converter, which has minimal components, and therefore is widely used in voltage regulator applications. In an example application, the input voltage to the buck converter is typically $12V_{DC}$. An output voltage produced by the voltage regulator may be $5.0V_{DC}$, $3.3\ V_{DC}$, or even lower.

Conventional multiphase interleaved voltage regulator power supply topologies can include two or more power converter phases that operate in parallel with each other to convert power and supply power to a corresponding load. Implementation of a multiphase voltage converter topology (as compared to a single voltage converter phase topology) can therefore enhance the output current capability of a power supply system.

A typical configuration of a voltage regulator such as a so-called synchronous buck converter includes an inductor, a high side switch, and a low side switch. During operation, a controller associated with the buck converter repeatedly pulses the high side switch ON to convey power from a power source through the inductor to a dynamic load. The controller repeatedly pulses the low side switch ON to provide a low impedance path from a node of the inductor to ground in order to control an output of the buck converter. Thus, the energy stored in the inductor increases during a time when the high side switch is ON and decreases during a time when the low side switch is ON. During switching operation, the inductor transfers energy from the input to the output of the converter phase.

In today's computer applications, respective processors (e.g., a load) can require activation of anywhere from 1 to 8 phases to power a load. In typical cases, phases are parallel, pulse-width modulated (PWM) buck converter channels, running at the same frequency but at a different phase angle.

According to conventional analog controllers, as the number of phases of a buck converter increases, the circuitry needed for pulse generation is replicated for each additional phase. For example, a first circuit is used to control timing and generate a pulse width modulation signal to control a first phase, a second circuit is used to control timing and generate a pulse width modulation signal to control a second phase, and so on. Each circuit generally operates independently, except the phases are controlled to be offset from each other. Thus, a conventional analog controller circuit for a multiphase power supply can occupy a substantial amount of real estate on a printed circuit board, especially when many phases are implemented. Note also that there is considerable cost incurred for the electrical components implemented in the controller circuit, which also increases when implementing many phases.

In an analog controller, the PWM modulator typically consists of a precision ramp generator, a comparator, and a flip-flop and control logic. For large numbers of phases (such as greater than 4) it is difficult and costly to design in the ramp generators and comparators to have required precision and matching.

SUMMARY

Techniques discussed herein deviate with respect to conventional applications such as those discussed above. For example, embodiments herein are directed to providing power to a dynamic load using novel power supply circuitry.

According to one configuration as described herein, a controller operates a time delay circuit such as counter to detect passing of time. Based on use of the time delay circuit, the controller is able to delay activation of high side switch circuitry for each of one or more phases in order to power a dynamic load.

More specifically, during operation, the controller loads the time delay circuit with a predetermined (count) value. The predetermined count value specifies an approximate time delay between activating high side switch circuitry of one or more phases in the power supply. Based on repeatedly loading the time delay circuit with the predetermined count value at appropriate times, high side switch circuitry (of a same or different phase) in the power supply can be successively activated or spaced in time by an approximate amount as specified by the predetermined (count) value.

In accordance with one embodiment as further discussed below, the actual spacing of control signals need not be equal to the predetermined count value loaded into the time delay circuit. Instead, the spacing of control signals can vary.

For example, in one embodiment, the controller compares a count value maintained by the time delay circuit with a pulse width modulation value that specifies a time duration (or pulse width) for activating a high side switch circuitry of a power supply to power a dynamic load. The pulse width modulation value can vary depending on a parameter such as a magnitude of the dynamic load. The controller can monitor the magnitude of the dynamic load based on parameters such as the output voltage of the power supply as well as how fast the output voltage changes over time.

As a more specific example, when the dynamic load suddenly increases in which the dynamic load consumes more current, the output voltage of the power supply can suddenly drop in value. In this instance, the controller detects the condition and, via application of control laws, generates the pulse width modulation value to be a larger count so that respective high side switch circuitry in the power supply (when activated based on the time delay circuit) is activated for a longer duration of time (e.g., longer pulse width) to account for the increase in current consumption.

When the dynamic load suddenly decreases in which the dynamic load consumes less current, the output voltage of the power supply can suddenly increase. In this instance, the controller generates the pulse width modulation value to be a smaller count value so that respective high side switch circuitry in the power supply is activated for a shorter duration of time (e.g., shorter pulse width) to account for the decrease in current consumption.

As will be discussed later in this specification, the activation and deactivation of pulses can be indirectly related to the magnitude of the load. For example, the pulse widths for activation and deactivation of the high side switch circuitry in respective phases can be directly related to pulse width modulation values produced by a control law, which may be influenced by parameters such as a current output voltage value of the power supply and how fast it is changing.

In accordance with embodiments herein, the times of activating and deactivating the one or more phases in a respective control cycle depend on passage of time as tracked by a time delay circuit. As mentioned above, durations of the pulse widths for activating the one or more phases varies depending on a state or magnitude of the dynamic load.

In furtherance of embodiments herein and by way of a non-limiting example, the time delay circuit can be configured as a counter that decrements toward zero. While decrementing towards zero and in response to detecting that the value stored in the time delay circuit becomes substantially equal in value to the pulse width modulation value, the controller: i) initiates activation of high side switch circuitry in a first phase of the power supply, and ii) modifies the value of the time delay circuit by the predetermined count value.

As will be discussed further herein, activation of the high side switch circuitry can include turning ON one or more high side switches to couple an inductor of the respective phase to a power source. Modifying the value of the time delay circuit can include adding the predetermined count value to a current count value of the time delay circuit.

The pulse width modulation value (specifying the pulse width) can vary over time depending on current consumption by the dynamic load. For example, when the dynamic load requires more current, the pulse width modulation value can be larger in magnitude than when less current is consumed by the load.

Changes in the pulse width modulation value can result in high side switch circuitry of the power supply turning ON earlier or later in time such that the activation or deactivation of the high side switch circuitry is not spaced exactly by an amount as specified by the predetermined count value. For example, if the dynamic load instantaneously requires more current, the pulse width modulation value increases, resulting in an earlier activation of high side switch circuitry in a phase of the power supply. On the other hand, if the dynamic load instantaneously requires less current, the pulse width modulation value decreases resulting in a later activation of high side switch circuitry in a phase of the power supply.

Accordingly, embodiments herein can include a method combining both frequency modulation and pulse width modulation to control one or more phases to power a dynamic load. A single time delay circuit can be used to space activation of high side switch circuitry in each of multiple phases.

The above example illustrates an embodiment in which both leading and trailing edges of activating high side switch circuitry can vary over time. Note that in yet further embodiments as described herein, a time delay circuit such as a counter can be implemented to generate phase control signals with fixed leading edges and variable trailing edges. For example, in such an embodiment, the leading edges of activating high side switch circuitry in the power supply can be spaced by an equal amount as specified by a predetermined value loaded into a counter. In one embodiment, a single counter can be repeatedly loaded with the predetermined value upon respective times of activating high side switch circuitry of a phase. Upon detecting that the amount of time as specified by the counter has passed, the controller initiates activation high side switch circuitry in the power supply and reloading of the counter with the predetermined count value again. This process is repeated to space activation of the high side switch circuitry of one or more phases by a substantially equal amount.

As will be discussed later in this specification, trailing edges for deactivating the high side switch circuitry can be varied depending on a pulse width modulation value, which in turn, depends on a magnitude of the dynamic load. For example, during conditions such as when the dynamic load consumes more current, the trailing edges of the control signals can be adjusted farther from respective fixed leading edges as discussed above to increase a size of the pulse widths for activating the high side switch circuitry. During conditions such as when the dynamic load consumes less current, the trailing edges occur closer to respective fixed leading edges to decrease a size of the pulse widths for activating the high side switch circuitry.

In still further embodiments, a time delay circuit such as a counter can be implemented to generate control signals with variable leading edges and fixed trailing edges. In such an embodiment, the trailing edges for deactivating high side switch circuitry in the power supply are spaced by an equal amount as specified by a predetermined value loaded into a time delay circuit such as counter. As will be discussed later in this specification, the leading edges for activating the high side switch circuitry can be varied to account for changes in the dynamic load.

Although the teachings herein are well suited for use in switching power supply circuitry, it should be noted that embodiments herein are not limited to use in such applications and that the techniques discussed herein are well suited for other applications as well.

Note also that each of the different features, techniques, configurations, etc. discussed herein can be executed independently or in combination with any or all other features also described herein. Accordingly, the present invention can be embodied, viewed, and claimed in many different ways.

This summary section does not specify every embodiment and/or incrementally novel aspect of the present disclosure or claimed invention. Instead, this summary only provides a preliminary discussion of different embodiments and corresponding points of novelty over conventional techniques. For additional details and/or possible perspectives or permutations of the invention, the reader is directed to the Detailed Description section and corresponding figures of the present disclosure as further discussed below.

BRIEF DESCRIPTION OF THE DRAWINGS

The foregoing and other objects, features, and advantages of the invention will be apparent from the following more particular description of preferred embodiments herein, as illustrated in the accompanying drawings in which like reference characters refer to the same parts throughout the different views. The drawings are not necessarily to scale, with emphasis instead being placed upon illustrating the embodiments, principles and concepts.

DETAILED DESCRIPTION

Figure 1:
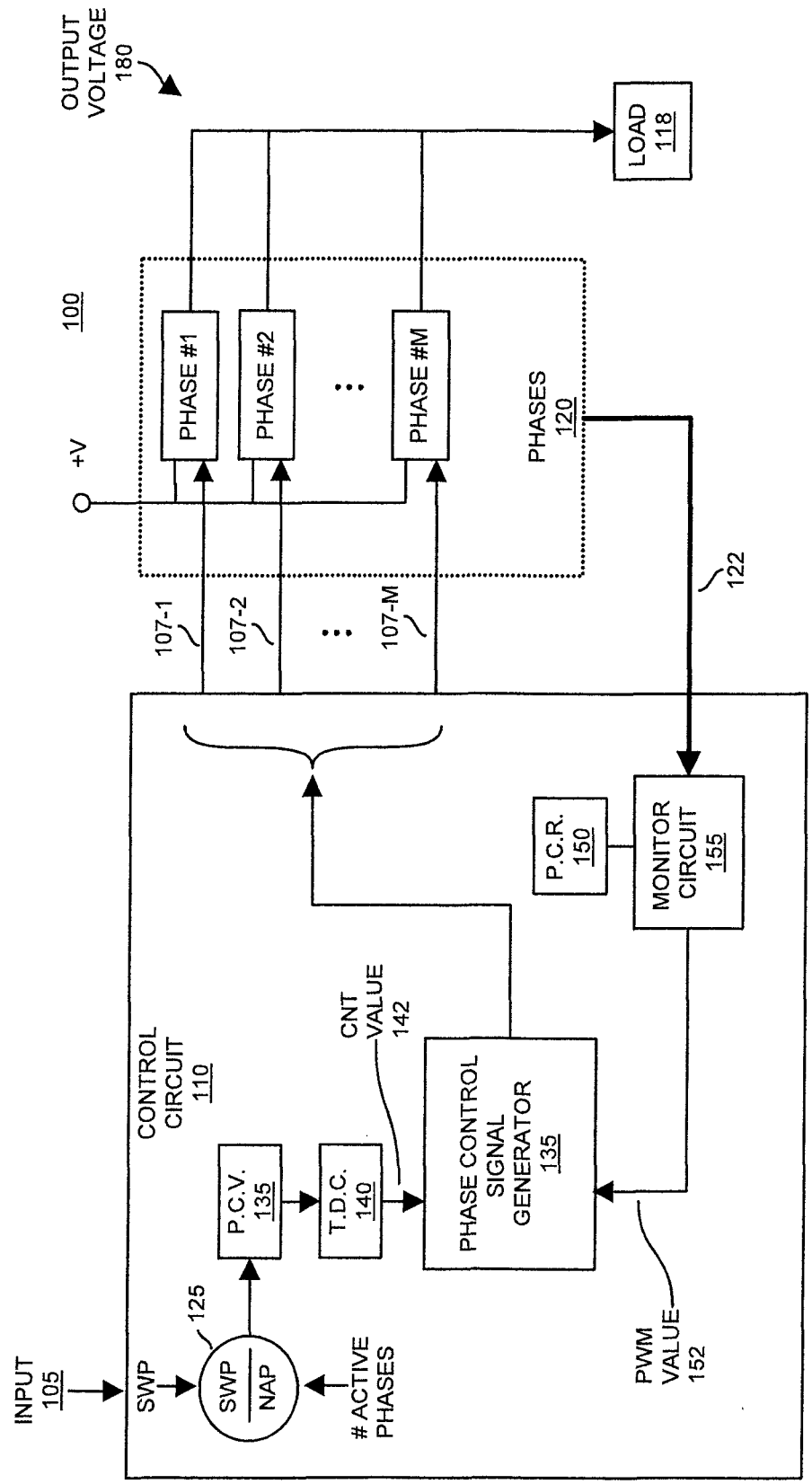
FIG. 1 is an example diagram of a multi-phase power supply according to embodiments herein.

FIG. 1 is an example diagram illustrating a multi-phase power supply 100 for producing output voltage 180 according to embodiments herein. As shown, the multi-phase power supply 100 includes one or more phases 120 such as phase #1, phase #2, ..., phase #M. The number of phases, multiple, can be any reasonable integer value.

The power supply 100 can be configured to include a control circuit 110. The control circuit 110 can include arithmetic function 125, predetermined count value 135, time delay circuit 140, phase control signal generator 135, pulse width modulation control rules 150, and monitor circuit 155.

During operation, the controller 110 receives input 105 from a source specifying a value for SWP. The value SWP represents a switching period associated with phases 120.

In one embodiment, the value SWP represents a duration in which high side switch circuitry of each of the one or more phases 120 will be activated via corresponding control pulse on control signals 107. Timing diagrams in subsequent figures will be used to more particularly describe this aspect of the invention.

Input 105 can be received from a source such as a user or other entity that controls operation of controller 110. In other words, the value SWP can be programmable, re-configurable, or change depending on supplied settings.

The value of SWP can be based on counts, each of which represents a time duration by which the time delay circuit 140 increments or decrements. By way of a non-limiting example, in one embodiment, each count can represent 5 nanoseconds of time. The time delay circuit 140 can be a counter configured to decrement one count value every 5 nanoseconds or other specified value.

In general, the control circuit 110 generates phase control signals 107 to control each of the phases 120 and maintain the output voltage 180 within an acceptable range. To provide such control, the arithmetic function 125 divides the value SWP by the number of activated phases in the power supply 100 to produce predetermined count value 135. Note that in certain embodiments, the predetermined count value 135 can be set to a value equal to SWP/M−1. M equals a number of active phases. In one embodiment, the predetermined count value 135 (e.g., SWP divided by the number of active phases) represents an approximate time duration for spacing pulses (and/or edges) associated with control signals 107. In other words, as will be discussed in more detail below with respect to timing diagrams of FIGS. 3-6, the control circuit 110 utilizes the predetermined count value 135 as a measure for activating and/or deactivating high side switch circuitry and/or low side switch circuitry of the phases 120.

Note that the number of activated phases can change depending on the magnitude of the dynamic load 118. For example, as the dynamic load 118 consumes more current, additional phases can be activated to accommodate the current consumption. Conversely, one or more activated phases can be deactivated in response to less current consumption by the dynamic load 118. Thus, the predetermined count value 135 can change during operation depending on a number of activated phases 120 depending on the embodiment.

During operation, the controller circuit 110 initiates loading of the predetermined count value 135 into the time delay circuit 140. By way of a non-limiting example, the time delay circuit 140 can be configured as a counter whose value changes over time. The time delay circuit 140 thus tracks a passing of time.

Monitor circuit 155 monitors one or more parameters of multi-phase power supply 100 based on feedback 122. Feedback 122 can include information (e.g., voltage, current, etc.) indicating a magnitude of the dynamic load 118 such as present current consumption by the dynamic load 118.

Based on application of pulse width modulation control rules 150, the monitor circuit 155 generates a pulse width modulation value 152. The pulse width modulation value specifies a pulse duration for turning ON high side switch circuitry so that the output voltage 180 is maintained within an acceptable range. When the dynamic load 118 consumes larger amounts of current, the pulse width modulation value is relatively large. When the dynamic load 118 consumes smaller amounts of current, the pulse width modulation value is relatively small.

As will be discussed, the phase control signal generator 135 utilizes the count value 142 of the time delay circuit 140 and pulse width modulation value 152 produced by the monitor circuit 155 as inputs for generating the control signals 107.

Figure 2:
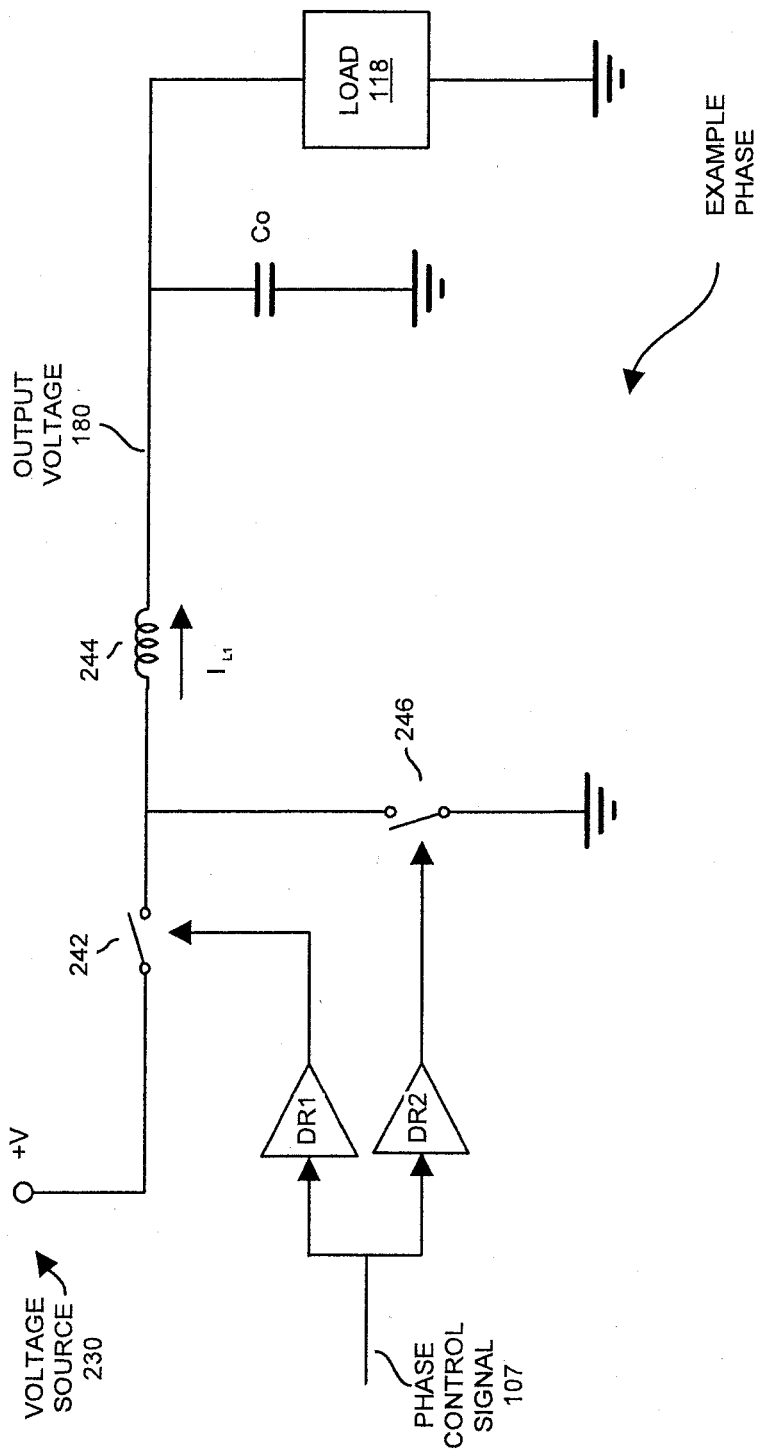
FIG. 2 is a diagram illustrating an example phase of the multi-phase power supply according to embodiments herein.

FIG. 2 is a diagram illustrating an example phase of multi-phase power supply 100 according to embodiments herein. As shown, control signal(s) 107 controls operation of respective high side switch circuitry 242 and low side switch circuitry 246. The high side switch circuitry 242 and low side switch circuitry 246 each can include one or more switches such as MOSFET devices.

When high side switch circuitry 242 is activated or turned ON (while low side switch circuitry 246 is OFF), the high side switch circuitry 242 creates a highly conductive path from voltage source 230 to the inductor 244. The current through inductor 244 thus increases. When low side switch circuitry 246 is activated or turned ON (while high side switch circuitry 242 is deactivated or turned OFF), the low side switch circuitry 246 creates a conductive path from the inductor 244 to ground. The current through inductor 244 thus decreases.

To deactivate a phase, the phase control logic 240 sets both high side switch circuitry 242 and low side switch circuitry 246 to an OFF state.

Figure 3:
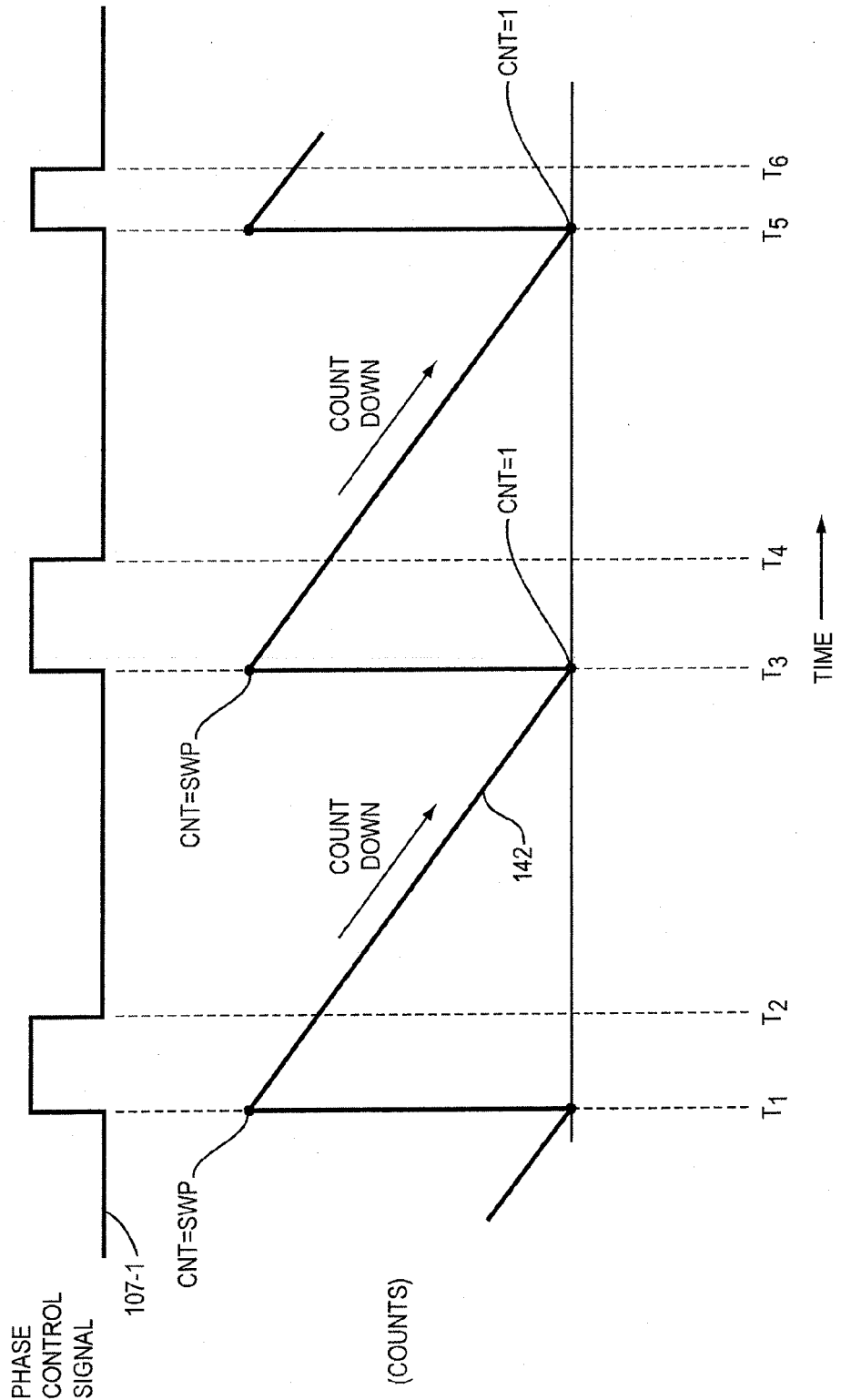
FIG. 3 is an example timing diagram for controlling a single phase of a power supply based on fixed leading edges and variable trailing edges according to embodiments herein.

FIG. 3 is an example timing diagram illustrating generation of a fixed leading edges according to embodiments herein. In other words, the control circuit 110 can control a sequence of one or more phases in the power supply such that respective high side switch circuitry of the multiple phases are activated based on fixed leading edges and deactivated based on variable trailing edges. That is, timing of the fixed leading edges of the multiple phases can be defined by the predetermined count value 135. The control circuit 110 can be configured to monitor the dynamic load 118 to adjust the pulse width modulation value 152, which is used to adjust the trailing edges (high to low transitions) of the multiple phases depending on the pulse width modulation value 152, which in turn, depends on a magnitude of the dynamic load 118.

As shown in this example, assume that the control circuit 110 activates a single phase such as phase #1 to power the dynamic load 118. At time t1, the control circuit 110 loads the time delay circuit 140 with the predetermined count value 135. At the same time, the control circuit 110 sets control signal 107-1 to a logic high to turn ON or activate respective high side switch circuitry of phase #1.

For a duration as specified by pulse width modulation value 152, the control circuit 110 maintains control signal 107-1 as a logic high until time t2. At such time (i.e., time t2), the control circuit 110 sets the control signal 107-1 to a logic low again to deactivate the high side switch circuitry in phase #1 and activate the low side switch circuitry of phase #1. Thus, embodiments herein can include: subsequent to initiating activation of the high side switch circuitry of a respective phase, controlling a time of deactivating the high side switch circuitry of a respective phase depending on pulse width modulation value 152, which in turn, depends on a magnitude of the dynamic load 118.

In one embodiment, the control circuit 110 determines a time of deactivating the high side switch circuitry based on initially resetting a pulse width modulation counter to zero and then incrementing the pulse width modulation counter around or after time t1.

In one example embodiment, if the PWM value 152 represents a the pulse width in clock cycles, then the control circuit 110 starts the pulse width modulation counter at 1 rather than 0. This is done because the counter stays at each value for 1 cycle, meaning that if it counts from 0 to 30, then there are 31 clock total cycles. For this reason, the time delay circuit 140 can be configured to count down from some value preset value to a count value of 1 and not down to 0.

Of course, whether the time delay circuit 140 is a counter that is configured to count down to zero or one is a design choice. The useful function provided by the time delay circuit 140 is keep track of passing time function which can be done in any number of ways known to one of skill in the art. The useful function provided by the pulse width modulation counter is also to keep track of passing time function, which can be done in any number of ways known to one of skill in the art. Also, in actual practice, it may not be important whether the counters actually count up from (or down to) a value such as one or zero because the feedback control system can automatically adjust the PWM value 152 so that the desired pulse width modulation is generated.

While counting, the control circuit 110 compares a value of the pulse width modulation counter to the pulse width modulation value 152. When the pulse width modulation counter equals or exceeds the pulse width modulation value 152, the control circuit 110 initiates deactivation of the high side switch circuitry of phase #1. This process can be used to generate each pulse.

Subsequent to time t1, the time delay circuit 140 decrements. By time t3, the count value 142 of the time delay circuit 142 decrements to a value of count=1 (or some other threshold value). When reaching this value, the control circuit 110 initiates activation of the high side switch circuitry of phase #1 again for a pulse duration as specified by pulse width modulation value 152 (in a similar manner as discussed above). Thereafter, the time delay circuit 140 decrements until time t5, at which time the high side switch circuitry of phase #1 is again activated.

Accordingly, subsequent to reloading of the predetermined count value in time delay circuit 140 and after passing of a respective time duration as specified by SWP, the control circuit 110 initiates activation of the high side switch circuitry of phase #1.

In this way, the control circuit 110 repeatedly controls respective leading edges (at times t1, t3, t5, etc.) of control signal 107-1 such that they occur at a fixed spacing of time from each other. The trailing edges (at times t2, t4, t6, etc.) vary depending on the pulse widths as specified by pulse width modulation value 152.

Figure 4:
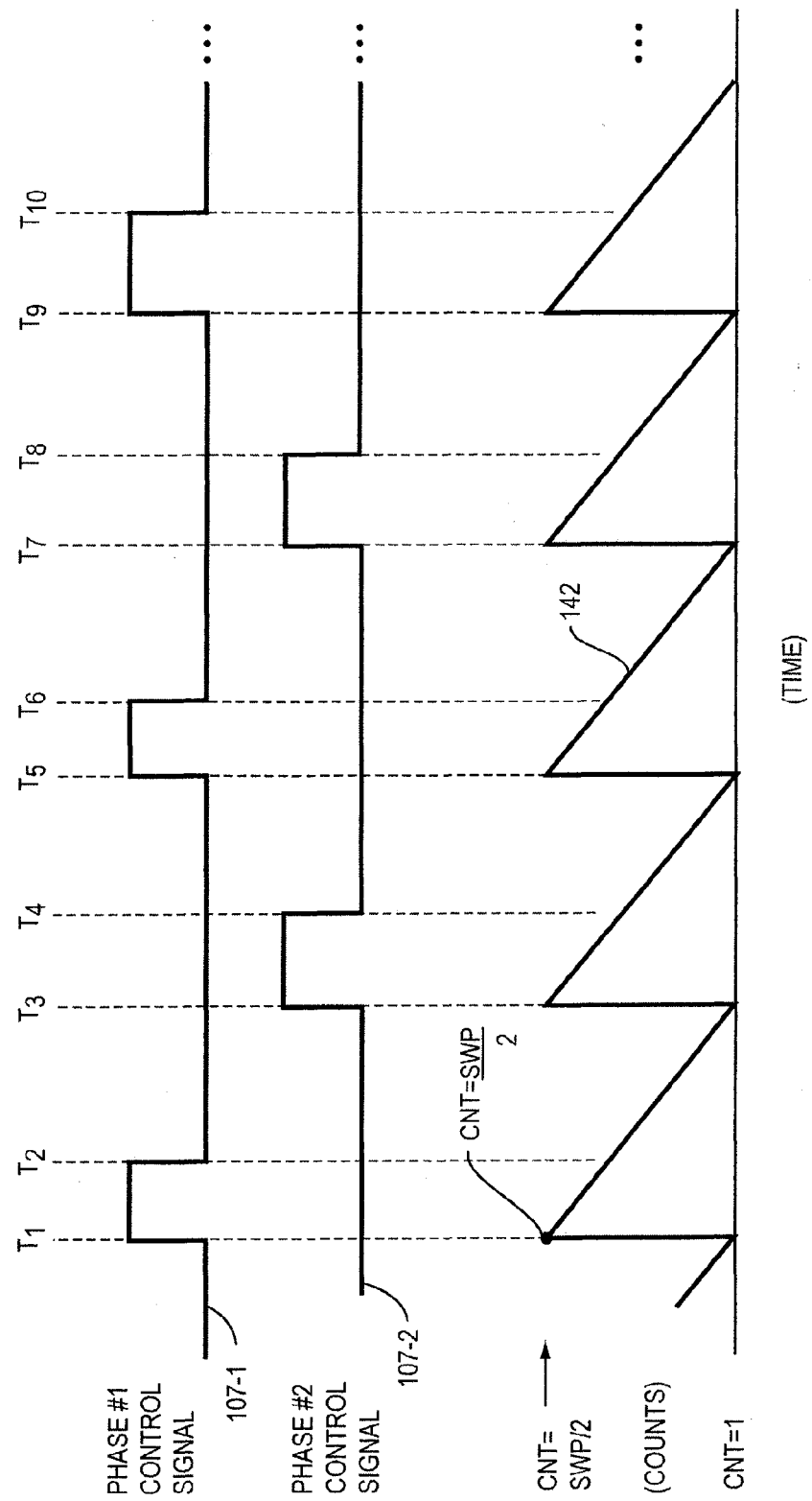
FIG. 4 is an example timing diagram for controlling multiple phases of a power supply based on fixed leading edges and variable trailing edges according to embodiments herein.

FIG. 4 is an example timing diagram illustrating generation of fixed leading edges for multiple activated phases according to embodiments herein. In this example, instead of only a single phase, two phases (phase #1 and phase #2) are activated to supply power to dynamic load 118. Because two phases are activated, the predetermined count value 135 is set to a count value equal to SWP/2. As previously discussed, the predetermined count value 135 can be set equal to SWP divided by the number of activated phases, or it can be set to a different number that results in the same switching period if the counter does not decrement from SWP/M to 1.

In this example, the control circuit 110 generates the leading edges of control signals 107-1 and 107-2 to be spaced by an amount equal to SWP/2.

For example, at time t1, the control circuit 110 loads the time delay circuit 140 with the predetermined count value 135 of SWP/2. Also at time t1, the control circuit 110 sets control signal 107-1 to a logic high to turn on respective high side switch circuitry of phase #1. The control circuit 110 maintains control signal 107-1 as a logic high for a duration as specified by pulse width modulation value 152 until time t2. At such time (i.e., time t2), the control circuit 110 sets the control signal 107-1 to a logic low again to deactivate the high side switch circuitry in phase #1 and activate the low side switch circuitry of phase #1.

Between time t1 and time t3, the time delay circuit 140 counts down to a value of count=1. At time t3, when reaching the value of count=1, the control circuit 110 initiates activation of the high side switch circuitry of phase #2 for a pulse duration as specified by pulse width modulation value 152. At time t3, the control circuit 110 also loads SWP/2 or adds a count value of SWP/2–1 to the time delay circuit 140.

The time delay circuit 140 counts down again subsequent to time t3. After passing of the time duration as specified by SWP/2 at time t5, the control circuit 110 initiates activation of the high side switch circuitry of phase #1 again and loads the predetermined count value 135 of SWP/2 (or adds SWP/2–1) into the time delay circuit 140 again.

In this way, the control circuit 110 controls respective leading edges (at times t1, t3, t5, etc.) of control signals 107-1 and 107-2 as shown such that they occur at a fixed spacing of time from each other. The trailing edges of control signals 107-1 and 107-2 as shown (at times t2, t4, t6, etc.) vary depending on the pulse widths as specified by pulse width modulation value 152. Also, as shown in FIG. 4, the control circuit 110 toggles between activating high side switch circuitry of the different phases.

If three phases such as phase #1, phase #2, and phase #3 were activated, the predetermined count value would be set to SWP divided 3. The controller 110 would then activate high side switch circuitry based on a time delay as specified by the predetermined count value 142. The phase order of activating respective high side switch circuitry would be phase #1, phase #2, phase #3, phase #1, phase #2, phase #3, phase #1, and so on.

Figure 5:
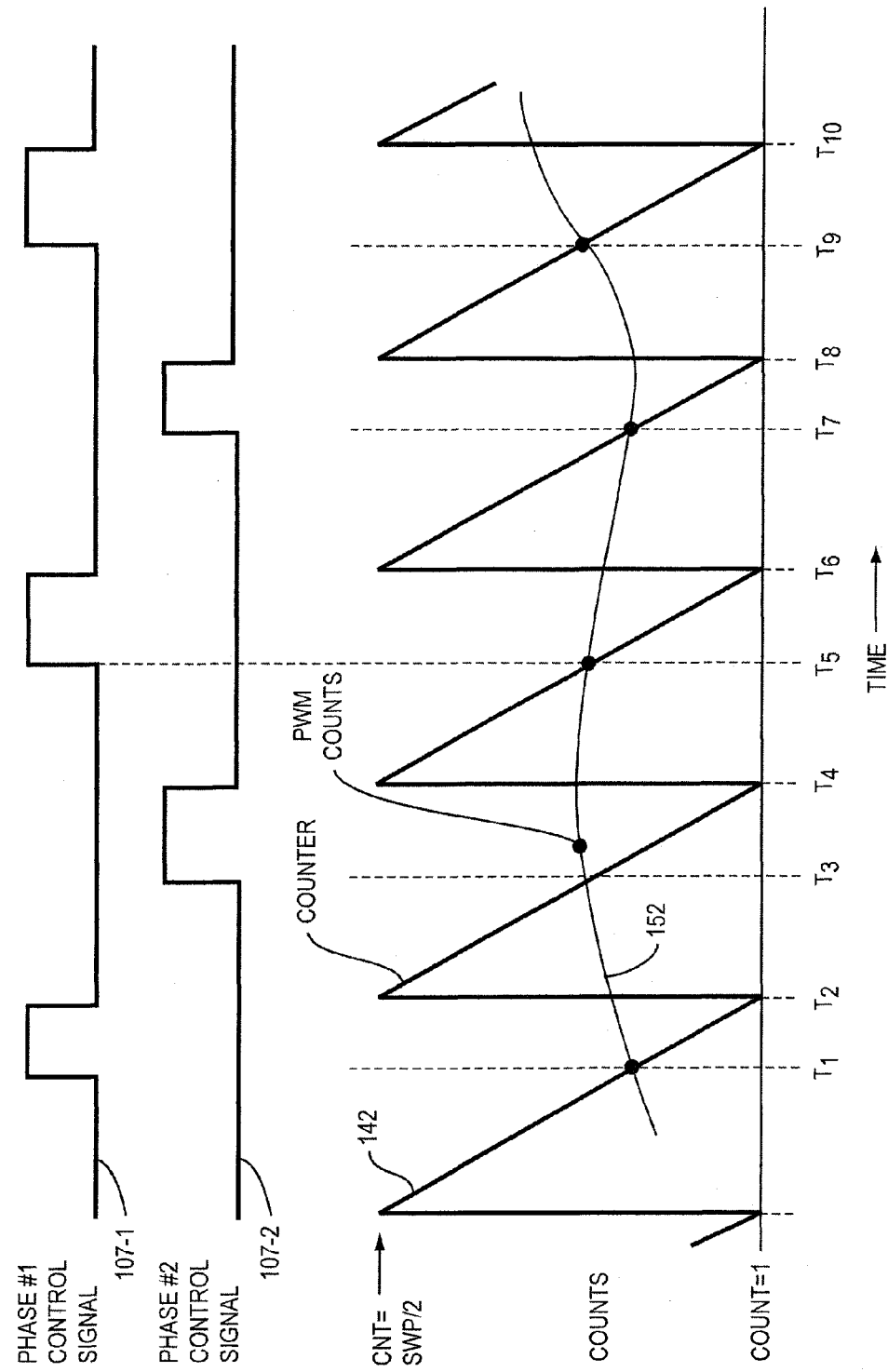
FIG. 5 is an example timing diagram for controlling multiple phases of a power supply based on variable leading edges and fixed trailing edges according to embodiments herein.

FIG. 5 is an example diagram timing diagram illustrating generation of fixed trailing edges according to embodiments herein. In other words, the control circuit 110 can control a sequence of one or more phases in the power supply 100 such that respective high side switch circuitry of the multiple phases are activated based on variable leading edges (low to high transitions) and deactivated based on fixed trailing edges (high to low transitions). As further discussed below, timing of the fixed trailing edges can be defined by the predetermined count value 135. The control circuit 110 can be configured to monitor the dynamic load to adjust the pulse width modulation value 152 and adjust the leading edges (low to high transitions) of the multiple phases depending on the pulse width modulation value 152, which can vary depending on the dynamic load 118.

As shown, the control circuit 110 reloads a value of predetermined count value 135 into the time delay circuit 140 at a same time as deactivating respective high side switch circuitry of a phase. The control circuit 110 activates leading edges of the phases depending on the pulse width modulation value 152.

For example, during operation, the control circuit 110 compares the count value 142 to the pulse width modulation value 152. When the two are equal such as at times t1, t3, t5, etc., the phase control signal generator 135 activates a leading edge by turning ON or activating of high side switch circuitry in a respective phase. Subsequent to respective leading edges, when the count value 142 is around zero counts or equal to one count at times t2, t4, t6, etc., the phase control signal generator 135 initiates turning OFF or deactivating of high side switch circuitry in a respective phase.

Note that the comparison of count value 142 and pulse width modulation value 152 is shown by way of non-limiting example only and that the value of SWP, SWP/2, SWP/3, . . . (depending on the number of activated phases) may be substantially greater in magnitude than the nominal value of pulse width modulation value 152. In one example embodiment, implementation of fixed trailing edges requires that the nominal pulse width modulation value 152 be less than SWP/M, because the control circuit 110 does not generate control signals having pulse widths greater than SWP/M.

In a similar manner as discussed above, if M phases such as phase #1, phase #2, . . . , phase #M were activated, the predetermined count value would be set to SWP divided M. The controller 110 would then deactivate high side switch circuitry based on a time delay as specified by the predetermined count value 142. The phase order of activating respective high side switch circuitry would be phase #1, phase #2, . . . , phase #M, phase #1, phase #2, . . . , phase #M, phase #1, and so on.

Figure 6:
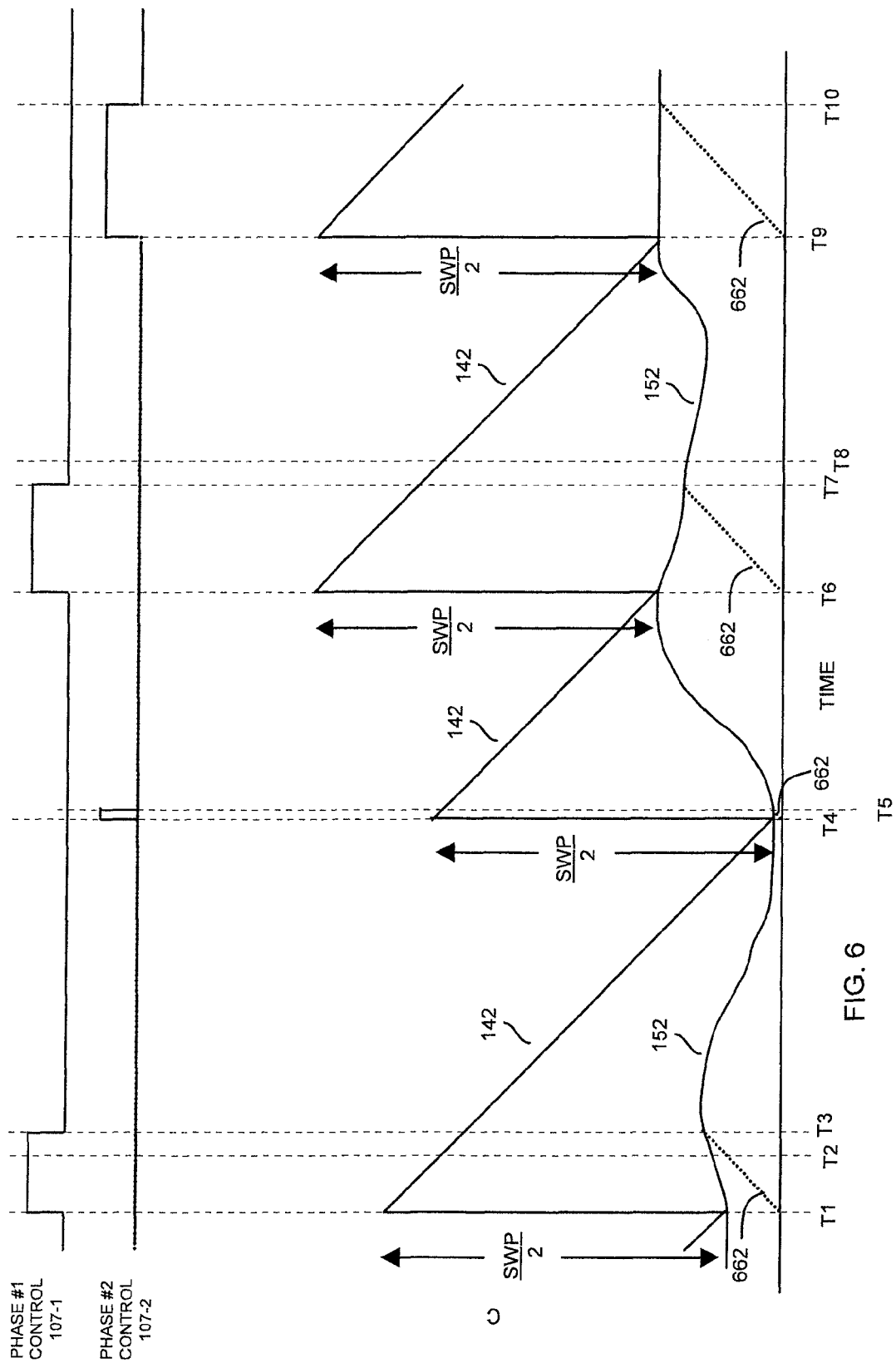
FIG. 6 is an example timing diagram illustrating generation of phase control signals for controlling a multi-phase power supply according to embodiments herein.

FIG. 6 is an example diagram illustrating generation of control signals 107 having respective variable leading and variable trailing edges according to embodiments herein. In this example embodiment, the control circuit 110 initiates adding the predetermined count value 135 to the time delay circuit 140 when the pulse width modulation value 152 produced by monitor circuit 155 is equal to the count value 142.

For example, at time t1, (as well as time t4, t6, t9, etc.) when the count value 142 is equal to the pulse width modulation value 152, the control circuit 110 initiates activation of the high side switch circuitry in phase #1. At or around time t1 as well as times t4, t6, t9, etc., the control circuit 110 adds SWP/2−1 (e.g., predetermined count value 135) to time delay circuit 140 as shown.

In order to produce a nominally constant switching period of SWP clock cycles with the M phases nominally uniformly spaced, a value of (SWP/M−1) should be added to a current count maintained by the time delay circuit 140. Then if the PWM value 152 were to be some constant number X, the time delay circuit would count down from (X+SWP/M−1) to X, a total of SWP/M clock cycles in each of the M phases. In the dynamic case, which is illustrated in FIG. 6, the PWM value 152 does not stay constant, and the time between phases varies.

The control circuit 110 controls a duration of maintaining the high side switch circuitry in an ON state based on the pulse width modulation value 152. For example, at time t1, the control circuit 110 resets a pulse width modulation counter that increments over time. Assume that the value stored in the pulse width modulation counter is shown as pulse width modulation count value 662.

In one embodiment, the pulse width modulation counter increments at a same rate that the time delay circuit 140 decrements.

During operation, the control circuit 110 compares a current value of pulse width modulation count value 662 of the pulse width modulation counter to the pulse width modulation value 142 produced by monitor circuit 155. When the pulse width modulation count value 662 is the same as or greater than the pulse width modulation value 152 at time t3, the control circuit 110 deactivates the high side switch circuitry of phase #1. The control circuit 110 performs a similar comparison to deactivate high side switch circuitry at times t5, t7, t10, etc.

Accordingly, embodiments herein can include: i) subsequent to initiating activation of high side switch circuitry of phase #1, tracking an amount of time that the high side switch circuitry of the phase #1 is activated; ii) comparing the amount of time that the high side switch circuitry is activated to the pulse width modulation value 152; and iii) in response to detecting that the amount of time is equal to or greater than the pulse width modulation value 152, initiating deactivation of the high side switch circuitry of phase #1.

In this example, between time t1 and t3, a magnitude of the dynamic load 118 increases, resulting in the monitor circuit 155 generating a larger pulse width modulation value 152. That is, instead of deactivating the high side switch circuitry at time t2, the control circuit 110 maintains the high side switch circuitry of phase #1 in activated state until time t3.

As indicated by pulse width modulation value 152, a magnitude of the dynamic load 118 can change during a time in which the high side switch circuitry of a respective phase is currently activated. In this example, the control circuit 110 accommodates the change in magnitude (of dynamic load 118) by extending a time in which the high side switch circuitry of phase #1 is activated until time t3 (rather than deactivating at time t2). Thus, the control circuit 110 can be very responsive to supplying the dynamic load with an appropriate amount of current to maintain the output voltage 180 within an acceptable voltage range.

Note that the dynamic load 118 also can instantaneously consume the same or less current. The control circuit 110 continues to compare the count value 142 to the pulse width modulation value 152. When the count value 142 is equal to the pulse width modulation value 152 around time t6, the control circuit 110 initiates activation of the high side switch circuitry in phase #1 again. At or around time t6, the control circuit 110 adds SWP/2−1 to the count value 142 maintained by time delay circuit 140 as shown. In a manner as previously discussed, subsequent to time t6, the control circuit 110 decrements the time delay circuit 140 at a constant rate to detect passing of time.

As mentioned above, the control circuit 110 controls a duration of maintaining the high side switch circuitry in an ON state based on the pulse width modulation value 152. For example, at time t6, the control circuit 110 resets the pulse width modulation counter. As mentioned above, the pulse width modulation counter increments over time.

Subsequent to time t6, the control circuit 110 compares pulse width modulation count value 662 of the pulse width modulation counter to the pulse width modulation value 142 produced by monitor circuit 155. When the pulse width modulation count value 662 is the same as the pulse width modulation value 152 at time t7, the control circuit 110 deactivates the high side switch circuitry of phase #1.

In this example, between time t6 and t8, a magnitude of the dynamic load 118 decreases, resulting in a smaller pulse width modulation value 152 that at time t6. Instead of deactivating the high side switch circuitry at time t8, the control circuit 110 deactivates the high side switch circuitry of phase #1 at time t7 in response to the reduced magnitude of dynamic load 118. Thus, a deactivation time of corresponding high side switch circuitry can be pulled in to accommodate lighter load conditions.

Note also that a magnitude of the dynamic load 118 and corresponding pulse width modulation value 152 may not change during a time of activating respective high side switch circuitry in a phase. For example, around time t4 through t5, the pulse width modulation value 152 remains relatively constant. In such circumstances, there is no pulling in or pushing out of the trailing edge. Instead, the control circuit 110 initiates deactivation of the high side switch circuitry in phase #2 at time t5 rather than before or after time t5.

Similarly, around time t9 through t10, the pulse width modulation value 152 remains relatively constant. In such circumstances, there is no pulling in or pushing out of the trailing edge. Instead, the control circuit 110 initiates deactivation of the high side switch circuitry in phase #2 at time t10 rather than before or after time t10.

In a similar manner as mentioned above, note again that activation of two phases is shown by way of non-limiting example only and that any number of phases can be activated with variable timing of leading edges and variable timing of trailing edges.

Also, the switching period, SWP, indicates a nominal value in which to base spacing of respective pulses. However, due to changes in the dynamic load 118, the magnitude of the pulse width modulation value 152 varies over time. According to one embodiment, both the pulse widths and spacing of pulses varies over time depending on the dynamic load 118.

For example, when the pulse width modulation value 152 instantaneously increases from one pulse to the next pulse such as at from time t4 to t6, the control circuit 110 initiates earlier activation of the respective high side switch circuitry such that the frequency of activation is effectively increased. In other words, the high side switch circuitry of phase #1 is activated around time t6, which is less than SWP/2 counts since activation of the high side switch circuitry associated with phase #2 occurring around time t4. Thus, when the dynamic load 118 increases, high side switch circuitry of one or more phases can be activated earlier to accommodate the change in load.

As another example, when the pulse width modulation value 152 instantaneously decreases from one pulse to the next such as from time t1 to t4, the control circuit 110 initiates later activation of the respective high side switch circuitry such that the frequency of activation is effectively decreased. In other words, the high side switch circuitry of phase #2 is activated around time t4, which is more than SWP/2 counts since activation of the high side switch circuitry associated with phase #1 occurring around time t1. Based on the pulse width modulation value 152, the control circuit 110 can initiate activation of respective high side switch circuitry of the phases by different amounts such that the pulse frequency of activation varies over time.

Also, the time delay circuit can be a single counter that is used to keep track of spacing associated of control signals for each of multiple phases. Reuse of the same circuit for multiple phases results in savings in board space as well as electronic circuit components.

Accordingly, embodiments herein include modulating multiple pulse widths as well as modulating an effective frequency of activating respective high side switch circuitry based on changes in the dynamic load 118.

As mentioned above, the control circuit 110 can use a single counter to keep track of spacing the pulses apart from each other.

In accordance with any of the embodiments as described herein, note that the predetermined count value 135 or time between sequentially activating high side switch and/or low side switch circuitry of the one or more phases can be varied depending on the state of the dynamic load 118.

For example, in one embodiment, the control circuit 110 can be configured to use a pre-defined function to modify the nominal phase period value, PPnom, which is the nominal switching period SWP divided by the number of phases, SWP/M, where M is the number of activated phases.

In such an embodiment, the control circuit 110 monitors the error voltage associated with output voltage 180. The error voltage is a measure of the difference in the magnitude of the output voltage 180 with respect to some reference value. When the error voltage is relatively small such as less than a pre-defined threshold value, the phase period or predetermined count value 135 (or SWP/M) is used to operate the time delay circuit 140 as discussed above to generate control signals 107.

If the output voltage 180 drops below a reference voltage by more than a threshold value, then the phase period value (e.g., the setting of the predetermined count value 135) can be reduced. For example, in one embodiment, the phase period or value of the predetermined count value 135 can be reduced by an amount determined by a linear function that produces a correction value, D, based on the error voltage, E, and the slope of the error voltage, S. In one embodiment, the error difference between samples can be used to approximate the slope associated with the error voltage with respect to time.

More specifically, the control circuit 110 can be configured to calculate a linear function of E and S as follows:

$D = (k1*E) + (k2*S)$, where k1 is a predetermined scale factor that converts voltage to time, and k2 is a predetermined scale factor that converts Volts/sec to time.

The modified phase period is:

$$PPmod = PPnom \quad \text{for } E < \text{threshold}$$
$$= PPnom - D \quad \text{for } D < PPnom, \text{ else}$$
$$= 0.$$

By temporarily setting the predetermined count value 135 to a smaller value or shortening PPmod by the amount D during heavy load conditions, the control circuit 110 turns on phases sooner than normal, thus reducing the voltage drop in the output voltage 180 following a step increase in required output load current. Thus, embodiments herein include modifying the predetermined count value 135 over multiple cycles of operating the time delay circuit 140 in response to detecting a change with respect to the dynamic load.

Figure 7:
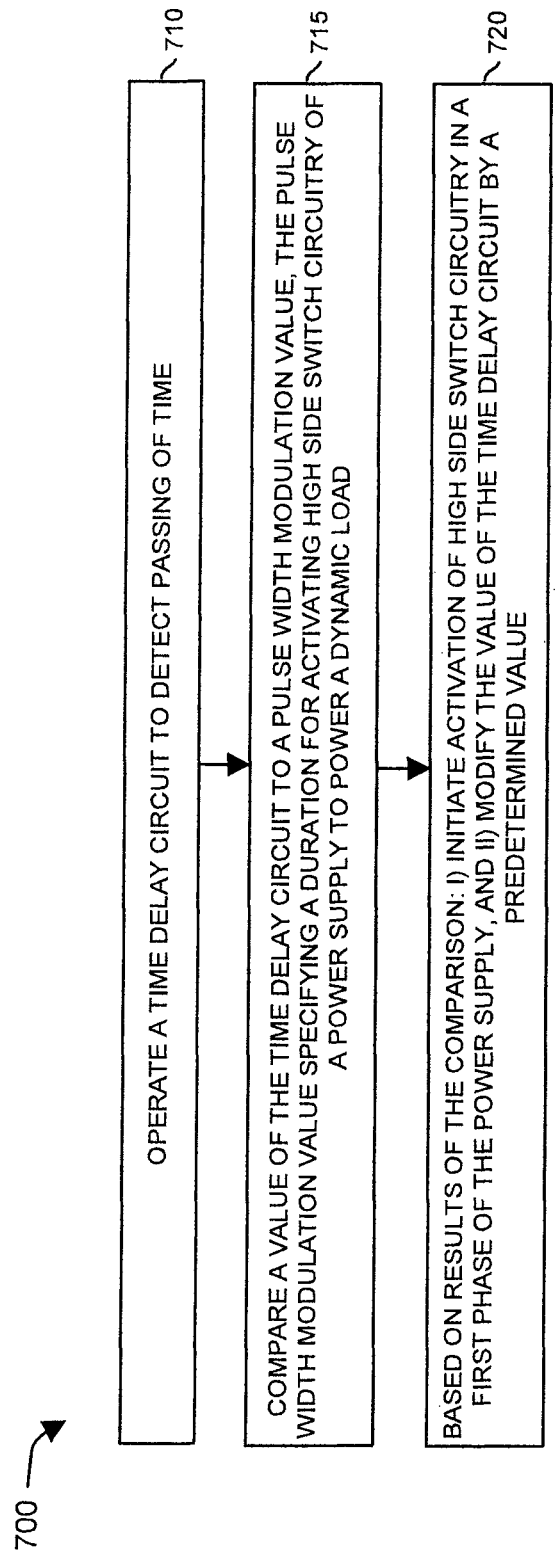
FIGS. 7-11 are example flowcharts illustrating example methods according to embodiments herein.

FIG. 7 is an example flowchart illustrating generation of control signals according to embodiments herein.

In step 710, the control circuit 110 operates time delay circuit 140 to detect passing of time.

In step 715, the control circuit 110 compares a count value 142 of the time delay circuit 140 to a pulse width modulation value 152. As previously discussed, the pulse width modulation value 152 specifies a duration for activating high side switch circuitry of a power supply 100 to power a dynamic load 118.

In step 720, based on results of the comparison, the control circuit 1101) initiates activation of high side switch circuitry in a phase of the power supply, and ii) modifies the value of the time delay circuit 140 by a predetermined count value 135.

Figure 8:
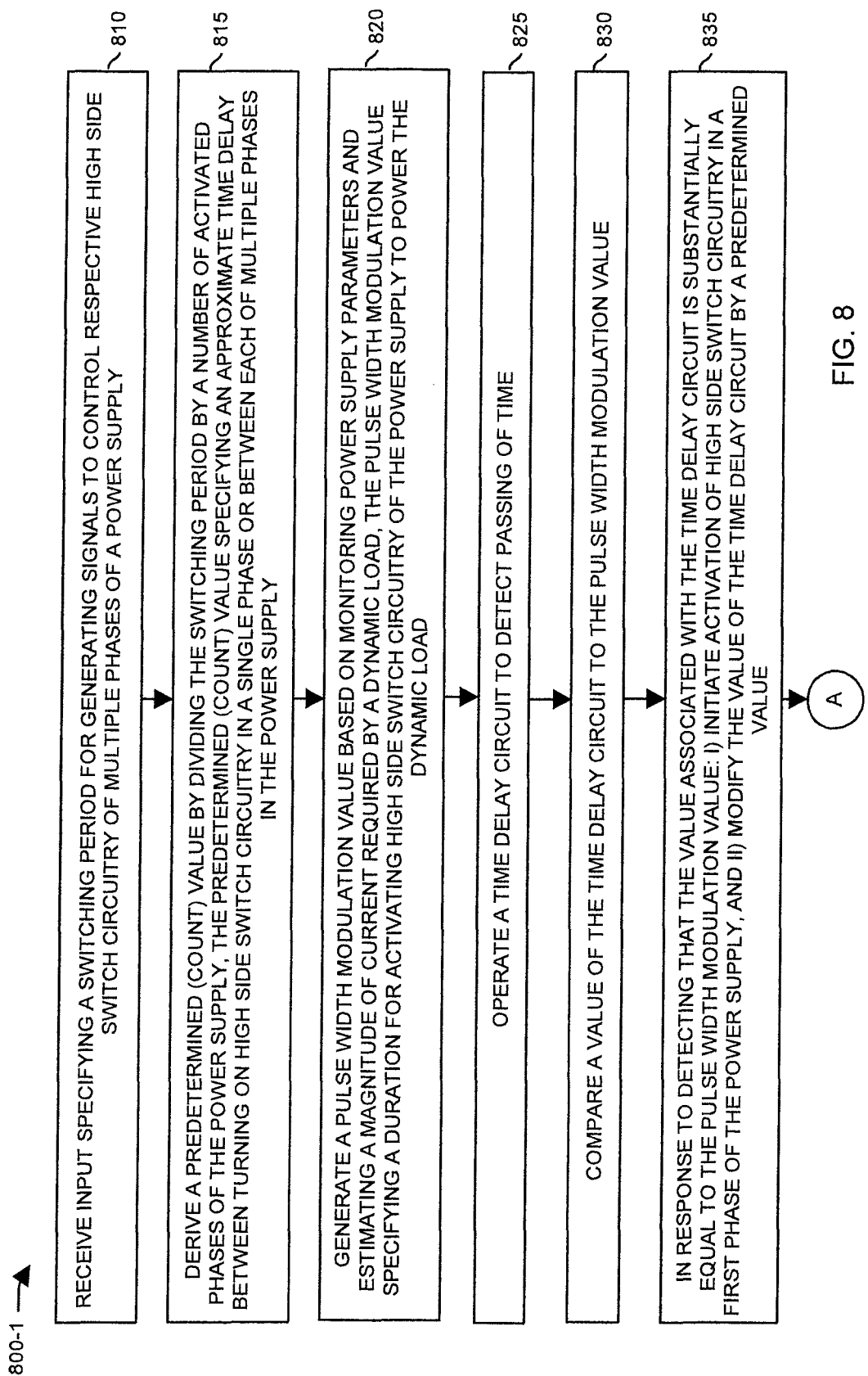
Figure 9:
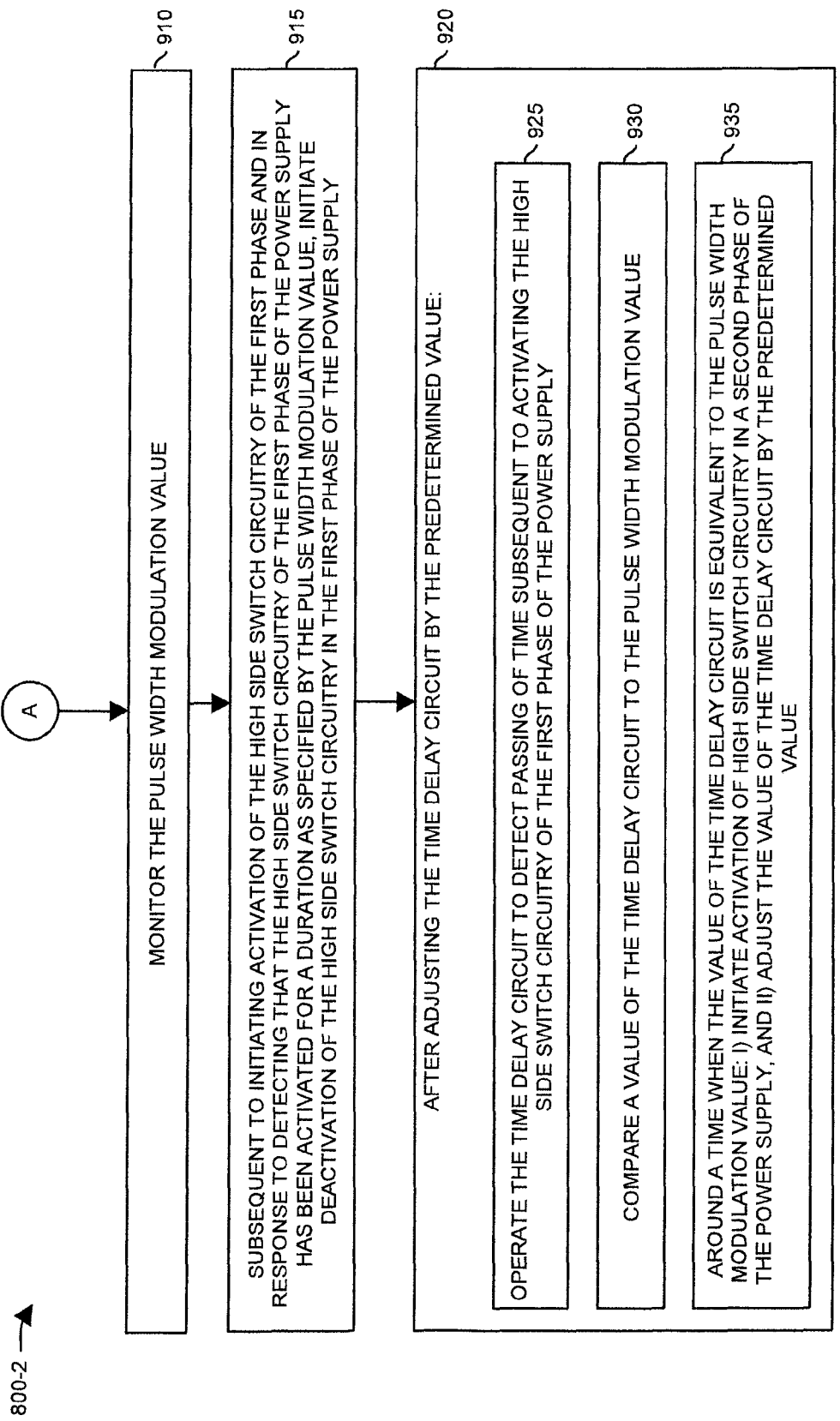

FIGS. 8 and 9 combine to form a flowchart 800 illustrating a technique of controlling phases of a multi-phase power supply 110 according to embodiments herein.

In step 810, the control circuit 110 receives input 105 specifying a switching period (SWP) for generating control signals 107 to control respective high side switch circuitry of multiple phases of a power supply 100.

In step 815, the control circuit 110 derives a predetermined (count) value 135 by dividing the switching period SWP by a number of activated phases of the power supply 100. In one embodiment, the predetermined (count) value 135 specifies an approximate time delay between turning on high side switch circuitry in a single phase or between each of multiple phases in the power supply.

In step 820, the control circuit 110 generates a pulse width modulation value 152 based on monitoring power supply parameters and estimating a magnitude of current required by a dynamic load 118. The pulse width modulation value 152 specifies a duration for activating high side switch circuitry of the power supply to power the dynamic load 118.

In step 825, the control circuit 110 operates time delay circuit 140 to detect passing of time.

In step 830, the control circuit 110 compares the count value 142 of the time delay circuit 140 to the pulse width modulation value 152.

In step 835, in response to detecting that the count value 142 associated with the time delay circuit 140 is around or substantially equal to the pulse width modulation value 152, the control circuit 1101) initiates activation of high side switch circuitry in a first phase of the power supply, and ii) modifies the value of the time delay circuit 140 by the predetermined value 152.

In step 910 of FIG. 9, the control circuit 110 monitors the pulse width modulation value 152.

In step 915, subsequent to initiating activation of the high side switch circuitry of the first phase and in response to detecting that the high side switch circuitry of the first phase of the power supply has been activated for a duration as specified by the pulse width modulation value 152, the control circuit 110 initiates deactivation of the high side switch circuitry in the first phase of the power supply.

In step 920, after adjusting the time delay circuit 140 by the predetermined value, the control circuit 110 operates the time delay circuit 140 to detect passing of time subsequent to activating the high side switch circuitry of the first phase of the power supply in step 925.

In step 930, the control circuit 110 compares the count value 142 of the time delay circuit 140 to the pulse width modulation value 152.

In step 935, around a time when the count value of the time delay circuit 140 is equal to the pulse width modulation value 152, the control circuit 1101) initiates activation of high side switch circuitry in a second phase of the power supply, and ii) adjusts or adds the predetermined count value to the count value 142 of the time delay circuit 140.

Figure 10:
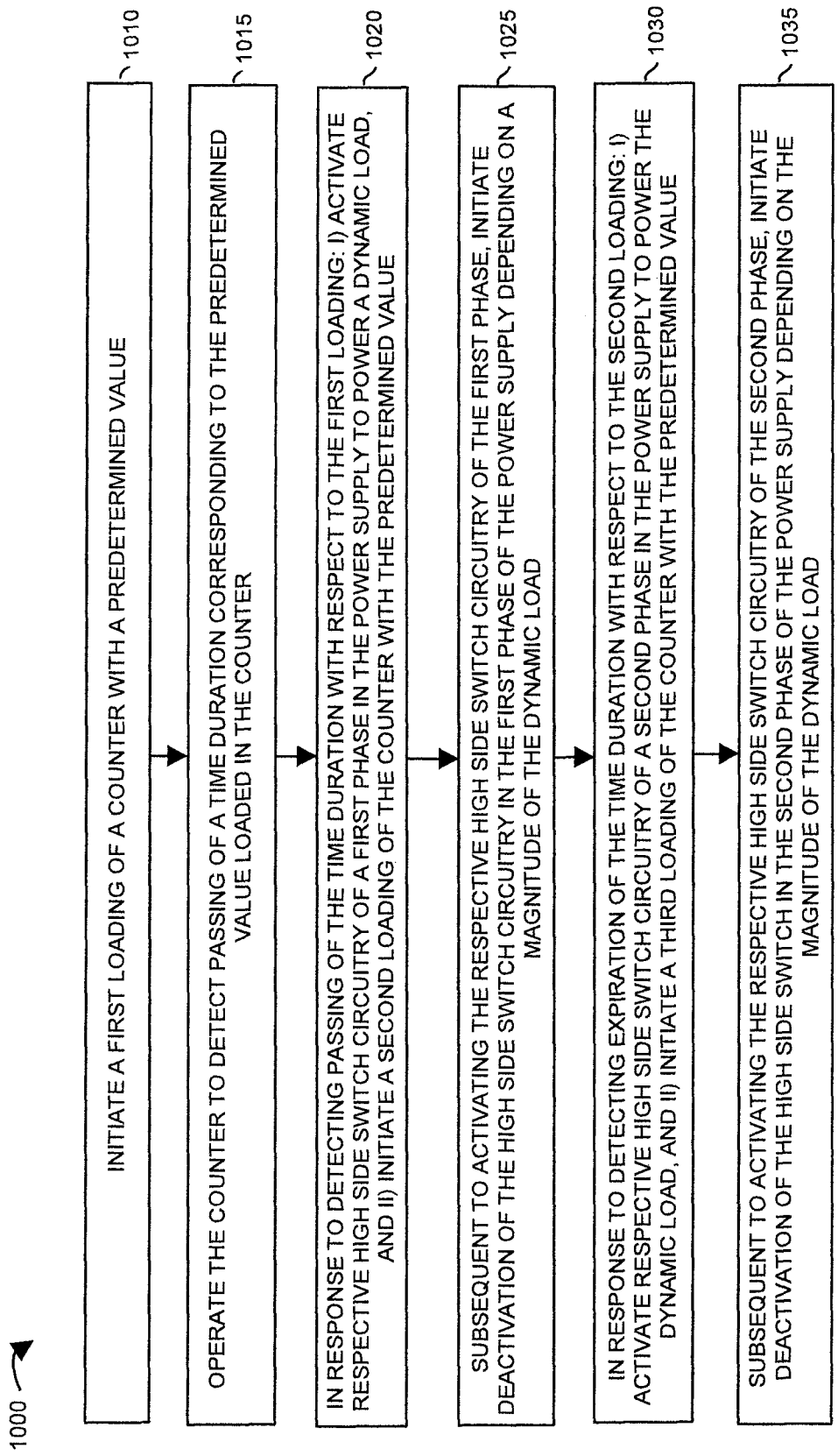

FIG. 10 is a flowchart 1000 illustrating a technique of controlling one or more phases of a multi-phase power supply 110 according to embodiments herein.

In step 1010, the control circuit 110 initiates a first loading of time delay circuit 140 such as a counter with a predetermined count value 135

In step 1015, the control circuit 110 operates the time delay circuit 140 to detect passing of a time duration corresponding to the predetermined value loaded in the time delay circuit 140.

In step 1020, in response to detecting passing of the time duration with respect to the first loading, the control circuit 1101) activates respective high side switch circuitry of a first phase in the power supply to power a dynamic load, and ii) initiates a second loading of the counter with the predetermined count value 135.

In step 1025, subsequent to activating the respective high side switch circuitry of the first phase, the control circuit 110 initiates deactivation of the high side switch circuitry in the first phase of the power supply depending on pulse width modulation value 152, which in turn, depends on a magnitude of the dynamic load 118.

In step 1030, in response to detecting expiration of the time duration with respect to the second loading, the control circuit 110: i) activates respective high side switch circuitry of a second phase in the power supply to power the dynamic load, and ii) initiates a third loading of the counter with the predetermined count value 135.

In step 1035, subsequent to activating the respective high side switch circuitry of the second phase, the control circuit 110 initiates deactivation of the high side switch in the second phase of the power supply depending on the pulse width modulation value 152, which in turn, depends on a magnitude of the dynamic load 110.

Figure 11:
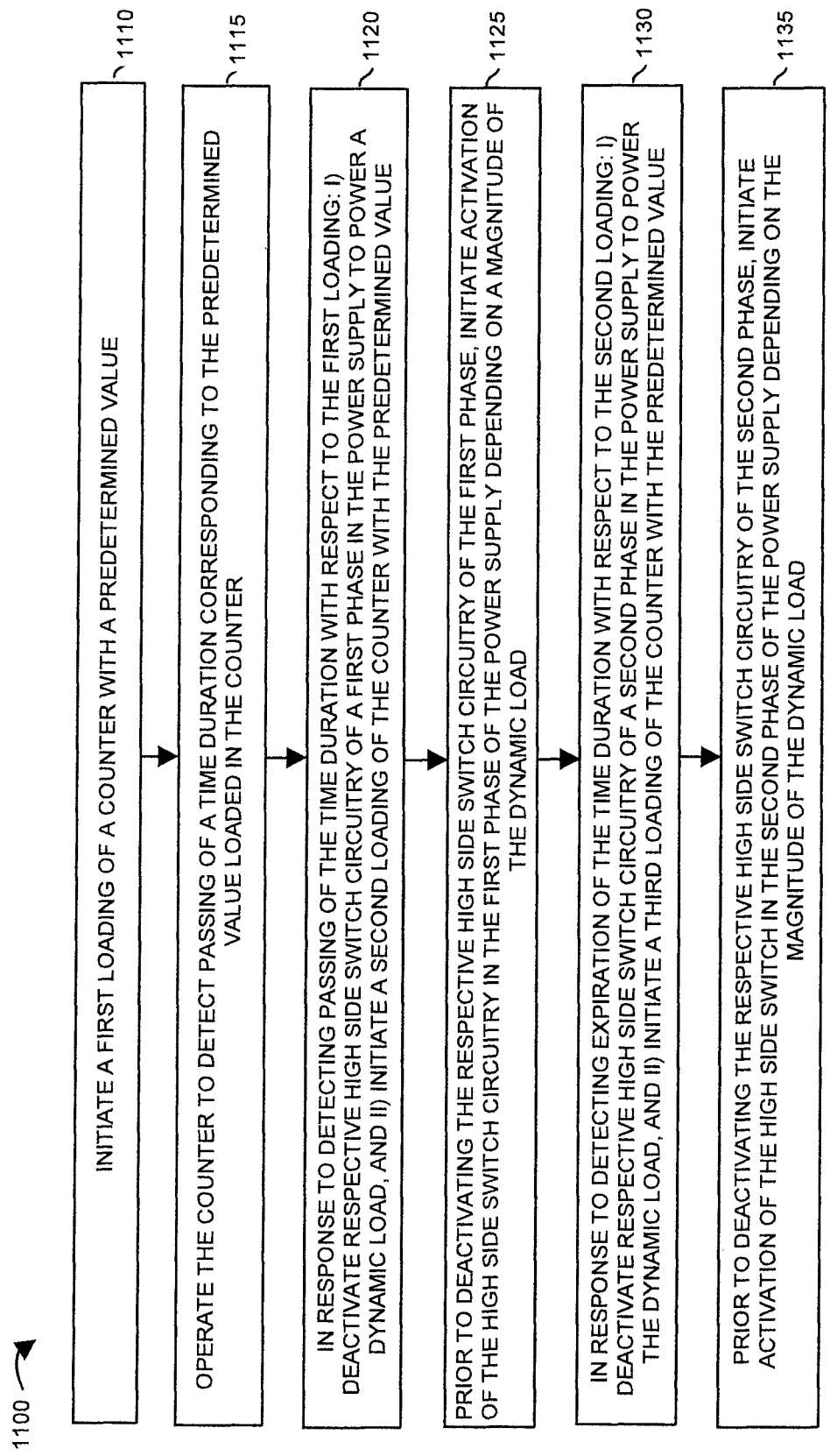

FIG. 11 is a flowchart 1000 illustrating a technique of controlling one or more phases of a multi-phase power supply 110 according to embodiments herein.

In step 1110, the control circuit 110 initiates a first loading of the time delay circuit 140 (e.g., a counter) with a predetermined count value 135.

In step 1115, the control circuit 110 operates the time delay circuit 140 to detect passing of a time duration corresponding to the predetermined count value.

In step 1120, in response to detecting passing of the time duration with respect to the first loading, the control circuit 1101) deactivates respective high side switch circuitry of a first phase in the power supply 100 to power a dynamic load 118, and ii) initiates a second loading of the time delay circuit 140 with the predetermined count value 135.

In step 1125, prior to deactivating the respective high side switch circuitry of the first phase, the control circuit 110 initiates activation of the high side switch circuitry in the first phase of the power supply depending on pulse width modulation value 152, which in turn, depends on a magnitude of the dynamic load 118.

In step 1130, in response to detecting expiration of the time duration with respect to the second loading, the control circuit 1101) deactivates respective high side switch circuitry of a second phase in the power supply to power the dynamic load 118, and ii) initiates a third loading of the time delay circuit 140 with the predetermined count value 135.

In step 1135, prior to deactivating the respective high side switch circuitry of the second phase, the control circuit 110 initiates activation of the high side switch in the second phase of the power supply depending on the magnitude of the dynamic load 118 as specified by the pulse width modulation value 152.

Note that techniques herein are well suited for use in power supply applications. However, it should be noted that embodiments herein are not limited to use in such applications and that the techniques discussed herein are well suited for other applications as well.

While this invention has been particularly shown and described with references to preferred embodiments thereof, it will be understood by those skilled in the art that various changes in form and details may be made therein without departing from the spirit and scope of the present application as defined by the appended claims. Such variations are intended to be covered by the scope of this present application. As such, the foregoing description of embodiments of the present application is not intended to be limiting. Rather, any limitations to the invention are presented in the following claims.

What is claimed is:

1. A method comprising:

operating a time delay circuit to detect passing of time;

comparing a value stored in the time delay circuit to a pulse width modulation value, the pulse width modulation value specifying a duration for activating high side switch circuitry of a power supply to power a dynamic load; and based on results of the comparing i) initiating activation of high side switch circuitry in a first phase of the power supply, and ii) modifying the value of the time delay circuit by a predetermined value;

wherein the value stored in the time delay circuit is a count value that decrements over time;

wherein modifying the value of the time delay circuit by the predetermined value based on the results of the comparing includes: at a first point in time, in response to detecting that a magnitude of the count value is equal to the pulse width modulation value, adding the predetermined value to a setting of the count value at the first point in time;

subsequent to the first point in time;

adjusting the pulse width modulation value;

comparing the adjusted pulse width modulation value to the count value in the time delay circuit;

at a second point in time subsequent to the first point in time, in response to detecting that a magnitude of the count value is substantially equal to the adjusted pulse width modulation value, adding the predetermined value to a setting of the count value at the second point in time.

2. The method as in claim 1 further comprising:

monitoring the pulse width modulation value;

subsequent to initiating activation of the high side switch circuitry of the first phase and in response to detecting that the high side switch circuitry of the first phase of the power supply has been activated for a duration as specified by the pulse width modulation value, initiating deactivation of the high side switch circuitry in the first phase of the power supply.

3. The method as in claim 1 further comprising:

receiving input, the input specifying a switching period for generating signals to control respective high side switch circuitry of multiple phases of the power supply;

deriving the predetermined value by dividing the switching period by a number of activated phases of the power supply; and wherein operating the time delay circuit further comprises utilizing the time delay circuit to estimate times when to activate each of the respective high side switch circuitry of the multiple phases during a switching period as specified by the input.

4. The method as in claim 1, wherein the predetermined value specifies an approximate time delay between turning on the high side switch circuitry associated with the first phase and turning on high side switch circuitry of a second phase of the power supply.

5. The method as in claim 1 further comprising:

subsequent to initiating activation of the high side switch circuitry of the first phase, controlling a time of deactivating the high side switch circuitry of the first phase depending on a magnitude of the dynamic load;

subsequent to initiating activation of the high side switch circuitry of the first phase, tracking an amount of time that the high side switch circuitry of the first phase is activated;

comparing the amount of time to the pulse width modulation value; and in response to detecting that the amount of time is substantially equal to the pulse width modulation value, initiating deactivation of the high side switch circuitry of the first phase.

6. The method as in claim 1 further comprising:

generating the pulse width modulation value based on monitoring the dynamic load and estimating a magnitude of current required by the dynamic load.

7. A system comprising:

a time delay circuit to detect passing of time;

a phase control signal generator to compare a count value of the time delay circuit to a pulse width modulation value, the pulse width modulation value specifying a duration for activating high side switch circuitry to deliver power to a dynamic load; and the phase control signal generator configured to utilize results of the comparison to: i) initiate activation of high side switch circuitry in a first phase of a power supply, and ii) modify the count value of the time delay circuit by a predetermined value;

wherein the value stored in the time delay circuit decrements over time;

wherein a control circuit is configured to, at a first point in time, add the predetermined value to a setting of the value stored in the time delay circuit at the first point in time in response to detecting that a magnitude of the count value is equal to the pulse width modulation value;

wherein the control circuit, subsequent to the first point in time, is configured to:

adjust the pulse width modulation value;

compare the adjusted pulse width modulation value to the value stored in the time delay circuit;

at a second point in time subsequent to the first point in time, in response to detecting that a magnitude of the value is substantially equal to the adjusted pulse width modulation value, add the predetermined value to a current setting of the value stored in the time delay circuit at the second point in time.

8. The system as in claim 7, wherein the results of the comparison indicate that the count value of the time delay circuit is substantially equal to the pulse width modulation value.

9. The system as in claim 7, wherein the phase control signal generator is configured to:

monitor the pulse width modulation value; and subsequent to initiating activation of the high side switch circuitry of the first phase and in response to detecting that the high side switch circuitry of the first phase of the power supply has been activated for a duration as specified by the pulse width modulation value, initiate deactivation of the high side switch circuitry in the first phase of the power supply.

10. The system as in claim 7 further comprising:

input specifying a switching period for generating signals to control respective high side switch circuitry of multiple phases of the power supply; and an arithmetic function to derive the predetermined value by dividing the switching period by a number of activated phases of the power supply.

11. The method as in claim 1 further comprising:

in response to detecting a change in current consumption by the dynamic load, modifying the predetermined value over multiple cycles of operating the time delay circuit.

12. The method as in claim 1 further comprising:
subsequent to initiating activation of the high side switch circuitry of the first phase and adding the predetermined value:
adjusting a magnitude of the pulse width modulation value based on a change in a magnitude of the dynamic load; and
initiating deactivation of the high side switch circuitry in the first phase based on the adjusted pulse width modulation value.

13. The method as in claim 1 further comprising:
subsequent to initiating activation of the high side switch circuitry of the first phase:
adjusting the pulse width modulation value based on a change in a magnitude of the dynamic load; and
initiating deactivation of the high side switch circuitry in the first phase based on the adjusted pulse width modulation value.

14. The method as in claim 13, wherein the predetermined value is a switching period value specifying a time delay between turning on the high side switch circuitry associated with the first phase and turning on high side switch circuitry of a second phase of the power supply.

15. The method as in claim 1, wherein the predetermined value represents a switch period setting, the method further comprising:
receiving input specifying a switching period for generating signals to control respective high side switch circuitry of multiple phases of a power supply;
deriving the predetermined value by dividing the switching period by a number of activated phases of the power supply;
generating the pulse width modulation value based on monitoring power supply parameters and estimating a magnitude of current required by the dynamic load;
monitoring the pulse width modulation value; and
subsequent to initiating activation of the high side switch circuitry of the first phase and in response to detecting that the high side switch circuitry of the first phase of the power supply has been activated for a duration as specified by the pulse width modulation value, initiating deactivation of the high side switch circuitry in the first phase of the power supply.

16. The system as in claim 7, wherein the pulse width modulation value varies over time; and
wherein the count value of the time delay circuit is offset by different amounts with respect to settings of the pulse width modulation value over time.

17. The system as in claim 7, wherein the pulse width modulation value varies over time; and
wherein a transient increase in a magnitude of the pulse width modulation value causes a switching frequency of activating the high side switch circuitry to increase; and
wherein a transient decrease in a magnitude of the pulse width modulation value causes the switching frequency of activating the high side switch circuitry to decrease.

* * * * *